2,782,595

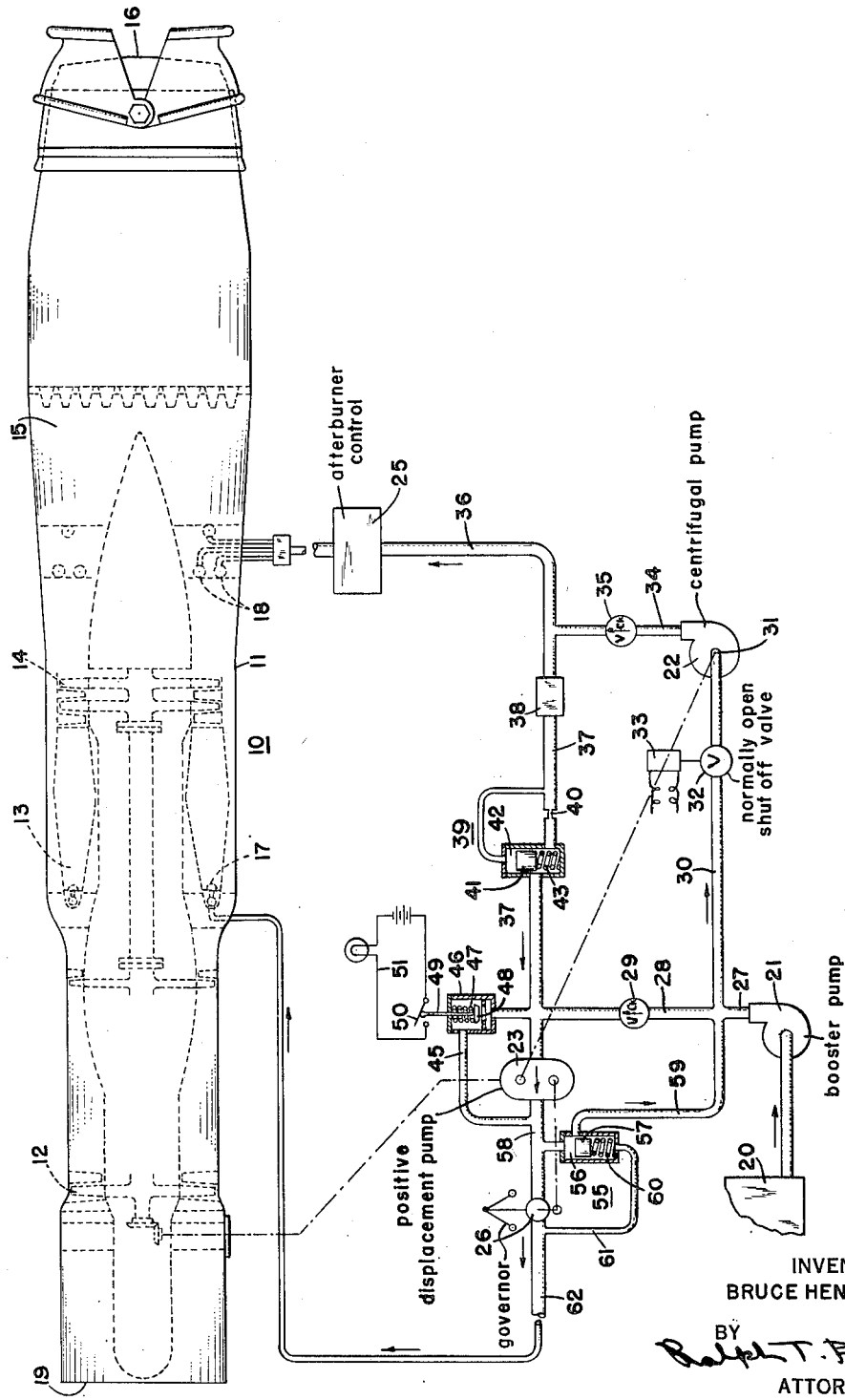

FUEL SYSTEM FOR A GAS TURBINE ENGINE

Bruce H. Pauly, Secane, Pa., assignor to Westinghouse Electric Corporation, East Pittsburgh, Pa., a corporation of Pennsylvania Application August 29, 1952, Serial No. 307,084

3 Claims. (Cl. 60—39.28)

This invention relates to fluid fuel systems for power plants, and more particularly to fuel pump apparatus for an aviation gas turbine engine.

One object of the invention is the provision of an improved fuel pumping system for an aviation gas turbine in which a high-speed and high pressure engine driven centrifugal fuel pump is disposed in series with and upstream of an engine driven pump of positive displacement type.

Another object of the invention is to provide an improved fuel pumping system of the foregoing construction in which the positive displacement pump having rubbing parts is normally operated while completely unloaded, with practically zero journal and side wall load, except during service incident to starting of the engine and while its speed is being increased to the idle rate, thus greatly extending longevity of the positive displacement element.

It is also an object of the invention to provide an improved fuel pumping system including a centrifugal pump and a positive displacement pump as aforesaid, in which the latter pump is operative to maintain prime of the centrifugal pump, in the event of aircraft fuel system interruption.

A further object is the provision of such a fuel pumping system in which the positive displacement fuel pump will serve to provide sufficient pressure at low speed to facilitate starting of the engine in a conventional manner, and thus permit utilization of the very compact, light weight, and durable single-stage centrifugal element as the primary engine-driven fuel pressure source for the basic engine.

Still another object of the invention is the provision of an improved combination and arrangement of an engine-driven centrifugal fuel pump and a positive displacement pump wherein the latter is adapted for automatic service as an emergency pumping unit, to assume the basic engine pumping load in the event of failure of the centrifugal pump, or in case the centrifugal pump is purposely shut off, as by closing its inlet valve, or unclutching the impeller from its drive, for minimizing heating of the fuel when engine fuel requirements are very low.

The features of the invention may readily be constructed and arranged for combination with other elements to provide a packaged fuel control or all-speed governor unit, which is adapted for installation on existing turbojet power plants without necessitating extensive modifications. It is a further object to devise an improved fuel pumping system which can be constructed and arranged to present more favorable weight and durability characteristics than current designs of combined primary and emergency pump equipments, eliminating at least one of the pump units heretofore considered necessary for afterburning turbojets, because the centrifugal type afterburner fuel pump can readily provide sufficient fuel for both engine and afterburner maximum requirements.

In the drawing, the single figure is a schematic view of one arrangement of an improved fuel pumping system constructed and arranged in accordance with the invention.

As shown in the drawing, an aviation gas turbine power plant or engine 10 may comprise cylindrical casing structure 11 in which are axially aligned the usual components including an axial flow compressor 12, main combustion apparatus 13, a turbine 14 which is adapted to drive the compressor, and an afterburner 15 terminating in a variable area exhaust nozzle 16. Nozzles 17 are provided for supplying fuel for the main combustion apparatus 13. Mounted in the afterburner 15 are spray rings 18 for supplying afterburning fuel. It will be understood that, in operation, air entering the inlet 19 is compressed and delivered by the compressor 12 to the combustion apparatus 13, where fuel, supplied thereto as hereinafter described, is burned to provide motive gases for driving the turbine 14. Upon expansion through the turbine, the motive gases and residual air flow through the afterburner, where additional fuel may be burned for augmenting the thrust at the exhaust nozzle 16.

According to the invention, fuel is supplied to the combustion apparatus 13 through a fuel system which comprises a source of fuel supply such as a reservoir 20 and conventional booster pump 21, a centrifugal primary pump 22, and a positive displacement or gear type secondary pump 23, which is arranged in series with and downstream of the primary pump. The fuel system further includes suitable afterburner control apparatus 25, which regulates the supply of fuel to the afterburner nozzles 18 and is of any well known construction which throttles fuel directly. An engine speed responsive governor 26 of conventional form is also provided for regulating or metering the flow to the combustion apparatus of fuel delivered from the pumps. One form of such a governor is diagrammatically disclosed in greater detail in the copending application of Buerer et al., Serial No. 300,192, filed July 22, 1952, and assigned to the assignee of the present invention.

The discharge conduit 27 of the booster pump 21 communicates by way of a conduit 30 with the inlet 31 of the centrifugal primary pump 22. Interposed in the conduit 30 is a normally open shut-off valve device 32, for cutting off the supply of fuel to the primary pump 22. If desired, a suitable coil 33 and control circuit (not shown) may be provided for controlling the shut-off valve device 32 when desired, as under engine operating conditions calling for a minimum supply of fuel. The discharge conduit 27 of the booster pump 21 also communicates with the inlet of the secondary pump 23 through a supply conduit 28 and check valve 29.

The discharge outlet of the primary pump 22 is connected, through a conduit 34 having mounted therein a check valve 35, and a conduit 36, to the inlet of the afterburner control apparatus 25. The primary pump discharge conduit 34 also communicates with the inlet of the positive displacement pump 23 by way of a conduit 37, in which are serially interposed a filter 38 and a constant pressure-differential valve device of the throttling type, generally indicated at 39.

The latter valve device may comprise a restricted passage or orifice 40 connected in the conduit 37, and a valve element 41 which is arranged in a chamber downstream of the orifice. The valve element 41 is urged toward a conduit closing position by the pressure of fuel in a chamber 42, that is connected to the conduit 37 upstream of the orifice 40, in opposition to the pressure of a spring 43 and of fuel in the conduit downstream of the orifice. The constant pressure differential valve device 39 is adapted to limit the maximum rate of flow of fuel toward the engine fuel control apparatus at a value slightly greater than the capacity of the positive displacement secondary pump 23. For bypassing the excess flow of fuel around the secondary pump 23, a by-pass 45, having a by-pass check valve device 46 interposed therein, is provided in communication with the inlet and discharge passages of the secondary pump.

The check valve device 46 may be utilized for indicating the load condition of the secondary pump 23, and for this purpose may comprise a valve element 48, which is urged toward closed position by a spring 47, and is adapted to be maintained open by the flow of fuel through the bypass 45. A stem 49 is carried by the valve element 48 for holding open a switch 50, which controls a signal circuit 51, so long as the valve element is unseated, owing to normal operation of the secondary pump 23 in unloaded condition. When the pump 23 is operated under load, as during initial acceleration of the engine to the idle speed, the spring pressed valve element 48 is seated and the switch is closed to effect energization of the signal circuit 51.

Associated with the speed responsive governor 26 is a relief valve device 55, comprising a casing having a chamber 56 which contains a valve element 57 for controlling bypassing of fuel from the discharge conduit 58 of the secondary pump 23 to a conduit 59 leading to the supply conduit 30. A spring 60 is provided for closing the relief valve element 57, with the aid of fuel pressure communicated to the underside of the valve element by way of a passage 61 connected to the conduit 62 at the discharge side of the governor device 26. The conduit 62 communicates with the fuel nozzles 17 of the combustion apparatus 13 in the power plant.

In operation, when the engine has been started and is being accelerated to idle speed, the positive displacement pump 23 is adapted to draw most of the fuel through the conduit 28 and past check valve 29 and to effect a supply of such fuel through the governor device 26 to the combustion apparatus 13, until the pressure-rise across the centrifugal pump is sufficient to overcome all flow losses between conduits 30 and 37. The centrifugal primary pump 22 becomes fully operative to take over the fuel supply function, when idle speed of the engine is reached and the centrifugal pump discharge pressure is high enough to meet fuel control demand in conduit 58, and thereafter all fuel flows by way of the conduit 30, the primary pump and conduits 34 and 37 to the inlet of the secondary pump, the flow of fuel in excess of the capacity of the latter being supplied past the unseated valve element 48 and through bypass 45 to the governor 26. The check valve 29, of course, prevents back flow through the conduit 28.

Thus, during normal full speed operation of the power plant, the centrifugal primary pump 22, having no rubbing components other than the usual shaft seal, efficiently carries the entire engine fuel load, including that of fuel for the afterburner 15, while the positive displacement secondary pump 23, having rubbing components, is still operated, but completely unloaded, with practically zero journal and side wall load. The secondary pump 23 is always available, nevertheless, for operation to maintain prime of the centrifugal primary pump, thus obviating any occasional tendency of the latter to falter temporarily, under possible adverse operating conditions. It will be apparent that the secondary pump 23 is also maintained in condition for immediate service in an emergency capacity, to assume the entire basic engine fuel pumping load in case of failure of the primary pump 22, or in the event that the latter is purposely shut-off by the closing of the inlet valve 32, to reduce fuel heating by rejection of excess pump horsepower when engine fuel requirements are very low.

While the invention has been shown in but one form it will be obvious to those skilled in the art that it is not so limited, but is susceptible of various changes and modifications without departing from the spirit thereof.

What is claimed is:

1. In a fuel system for a gas turbine engine having main combustion apparatus and afterburner combustion apparatus, a source of fuel, an engine-driven high-speed centrifugal primary pump having an inlet connected to said source and a discharge outlet, an engine-driven positive displacement secondary pump having an inlet and a discharge outlet, said secondary pump having a smaller pumping capacity at normal speed than that of said primary pump, a constant pressure communication connecting said discharge outlet of said primary pump to said inlet of said secondary pump, engine speed responsive governor means including passages connecting said discharge outlet of said secondary pump to the main combustion apparatus, a bypass including a spring-pressed check valve and connecting said communication at the inlet side of said secondary pump to said discharge outlet thereof, a conduit including another check valve and connecting said source of fuel to said inlet of the secondary pump, said centrifugal pump normally being operative at idling engine speed and higher engine speeds to supply fuel to said governor means at a rate exceeding the capacity of said positive displacement secondary pump so that the latter is normally operated without load, said secondary pump being adapted to supply fuel to said governor means when said engine is being started, said secondary pump also being always available to supply fuel to said governor means in the event of shutdown of said primary centrifugal pump, and afterburner fuel control means interposed between and connected to the discharge outlet of the centrifugal primary pump and said afterburner, whereby the primary pump is adapted normally to supply fuel for operation of the afterburner coincident with its supply of fuel to the main combustion apparatus.

2. In a fuel system for the combustion apparatus of a gas turbine engine, a source of fuel, an engine-driven high-speed centrifugal primary pump having an inlet connected to said source and a discharge outlet, an engine-driven positive displacement secondary pump having an inlet and a discharge outlet, said secondary pump having a smaller pumping capacity at normal speed than that of said primary pump, a constant pressure communication connecting said discharge outlet of said primary pump to said inlet of said secondary pump, engine speed responsive governor means including passages connecting said discharge outlet of said secondary pump to the engine combustion apparatus, a bypass including a spring-pressed check valve and connecting said communication at the inlet side of said secondary pump to said discharge outlet thereof, and a conduit including another check valve and connecting said source of fuel to said inlet of the secondary pump, said centrifugal pump normally being operative at idling engine speed and higher engine speeds to supply fuel to said governor means at a rate exceeding the capacity of said positive displacement secondary pump so that the latter is normally operated without load, said secondary pump being adapted to supply fuel to said governor means when said engine is being started, said secondary pump also being always available to supply fuel to said governor means in the event of shutdown of said primary centrifugal pump, said bypass including the check valve and connecting the constant pressure communication to the inlet of the positive displacement secondary pump having associated therewith an electrical signal circuit, and a switch interposed in said signal circuit and operatively connected to the last-named check valve for actuating said signal circuit upon closure of said check valve incident to load operation of said secondary pump.

3. Fuel pumping apparatus for supplying fuel under pressure to a fuel control for a turbojet having an afterburner, comprising a fuel source, a booster pump having an inlet connected to said source and a discharge outlet, a positive displacement pump of limited capacity having an inlet connected to said discharge outlet of the booster pump and a discharge outlet connected to said fuel control, a check valve preventing backflow from said positive displacement pump to said booster pump, a bypass including a check valve connecting said inlet of said positive displacement pump to the discharge outlet thereof, a centrifugal pump of large capacity and adapted to be driven with said positive-displacement pump, said centrifugal pump having an inlet connected to the discharge outlet of the booster pump and a discharge outlet connected to the inlet of said positive displacement pump, and constant pressure differential throttling valve means interposed and connected between said centrifugal pump and said positive displacement pump for maintaining a constant flow of fuel at said inlet of the positive displacement pump sufficient to unload the latter while effecting limited flow of fuel through said bypass to said fuel control.

References Cited in the file of this patent

UNITED STATES PATENTS

| | | |
|---|---|---|
| 2,500,227 | Adams | Mar. 14, 1950 |
| 2,609,868 | Carey | Sept. 9, 1952 |
| 2,631,658 | Abraham | Mar. 17, 1953 |
| 2,669,838 | Lee | Feb. 23, 1954 |

FOREIGN PATENTS

| | | |
|---|---|---|
| 941,556 | France | July 19, 1948 |